No. 875,994. PATENTED JAN. 7, 1908.
W. D. HARRIS.
TIRE.
APPLICATION FILED MAY 16, 1905. RENEWED FEB. 2, 1907.

Witnesses:
Titus H. Irons.
Wills A. Burrowes

Inventor:
William D. Harris:
by his Attorneys,

UNITED STATES PATENT OFFICE.

WILLIAM D. HARRIS, OF PHILADELPHIA, PENNSYLVANIA, ASSIGNOR TO HARRIS TIRE & RUBBER CO., OF PHILADELPHIA, PENNSYLVANIA, A CORPORATION OF MAINE.

TIRE.

No. 875,994.          Specification of Letters Patent.          Patented Jan. 7, 1908.

Application filed May 16, 1905, Serial No. 260,707. Renewed February 2, 1907. Serial No. 355,472.

*To all whom it may concern:*

Be it known that I, WILLIAM D. HARRIS, a citizen of the United States, residing in Philadelphia, Pennsylvania, have invented certain Improvements in Tires, of which the following is a specification.

Figure 1:
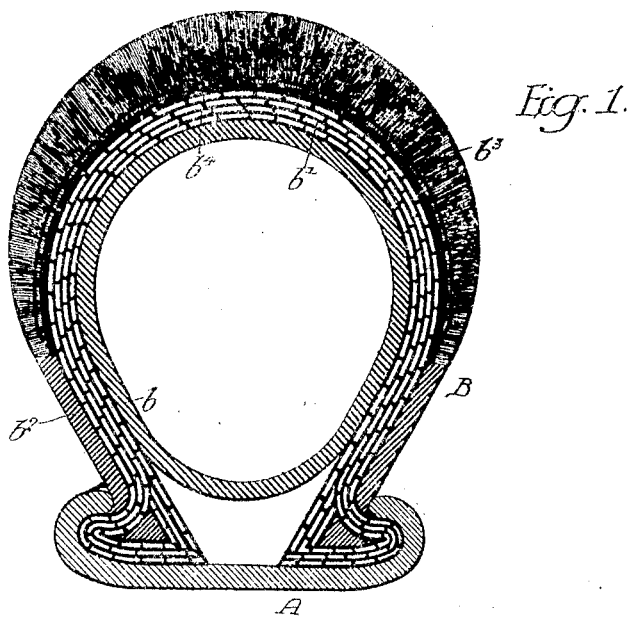
Figure 3:
Figure 2:
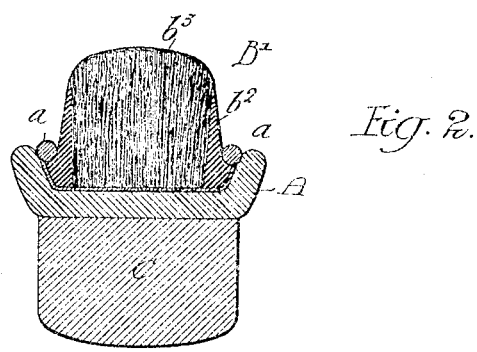

One object of my invention is to provide a tire of the pneumatic or cushion type which, under conditions of use, shall be relatively more durable and less likely to deteriorate than has hitherto been the case with tires belonging to the same general class. In order to accomplish this end I embed a body of fiber within the rubber tire in such manner that said fiber will materially increase its longevity and at the same time cause the wear to take place evenly and in such manner that there is no likelihood of injury to the tire due to the separation or tearing out of loose ends of the fiber. These objects I attain as hereinafter set forth, reference being had to the accompanying drawings, in which, Figure 1, is a vertical section of a well known form of pneumatic tire, showing my invention as applied thereto; Fig. 2, is a vertical section of a solid tire constructed according to my invention, and Fig. 3, is a vertical section illustrating a special arrangement of the fibers in a tire.

In carrying out my invention I form the wearing portion of the tire of a body of material consisting of fibers embedded in rubber or equivalent substance, which fibers are so placed that they are substantially perpendicular to the wearing surface of the tire; there usually being in addition other fibers extending at right angles to the lines of the main fibers for the purpose of holding these in position during the process of manufacture and also to give mechanical strength to the tire.

It will be understood that the two sets of fibers are interwoven in order that the fabric resulting may be of maximum strength.

In Fig. 1 of the accompanying drawings, A represents a vehicle rim to which the tire B is applied, this tire in the present instance being shown as consisting of an inner tube $b$ with a body portion $b'$, usually consisting of a plurality of plies of fabric and a tread or wearing portion $b^2$. It will be understood that this latter is permanently attached to and may form a part of the body of fabric $b'$, and my invention consists in embedding in this tread portion a series of fibers $b^3$ so arranged as to be substantially perpendicular to the outside surface of the tread or substantially perpendicular to a line tangent to the surface of the tread. These fibers extend between the fabric $b'$ and the outside surface of the tread, their inner ends preferably abutting upon said fabric. In order that the fibers $b^3$ may be suitably held in position during the manufacture of the tire, I preferably use a fabric having said fibers $b^3$ for its warp and the fibers $b^4$ for its weft, so that these former fibers are properly spaced and held in position while being surrounded or embedded in the body of rubber forming the supporting structure or body of the tread $b^2$.

It will be seen that under operating conditions the rubber will be protected by the fibers $b^3$, which will naturally project slightly beyond the surface of the tread and take the greater portion of the wear upon themselves. These fibers may consist of such materials as horse or other hair, as well as any desired form of vegetable fiber or even metallic wires, and I desire that my invention shall be construed as broadly covering the use of any of said materials.

In Fig. 2, I have shown the invention as applied to a solid tire, this being shown as in position upon a rim $A'$ carried on the felly C. The tire $B'$ is held in place by circumferentially extending wires $a$ and, as before, consists of a rubber body having embedded within it a series of fibers $b^3$ which extend in lines substantially perpendicular to the wearing surface of the tire.

If desired, the fibers while extending in lines practically perpendicular to the wearing surface, as above noted, may be interwoven as indicated at $b^5$ in Fig. 3, so as to cause them to be more firmly embedded in the rubber body of the tire, as well as to prevent the possibility of individual fibers becoming loosened or detached independently of one another.

I claim as my invention:

1. A tire including a body of fabric, a tread portion of resilient material outside of the same, and a series of fibers extending through the tread portion in a line substantially perpendicular to the wearing surface thereof and abutting upon a body of fabric, with a second body of fabric engaging said perpendicular fibers for spacing and holding them in position, substantially as described.

2. A tire having a tread consisting of a body of rubber and a body of fabric embedded therein, said body of fabric having weft threads extending in lines substantially parallel to the surface of the tread, with warp threads extending substantially perpendicular to the wearing surface of the tread, said tire having a body portion of fabric supporting said composite tread, substantially as described.

3. A tire having embedded in it a series of fibers extending in lines substantially perpendicular to its outside surface, said fibers being interwoven with each other, substantially as described.

In testimony whereof, I have signed my name to this specification, in the presence of two subscribing witnesses.

WILLIAM D. HARRIS.

Witnesses:
WILLIAM E. BRADLEY,
JOS. H. KLEIN.